(12) United States Patent
Cherepinsky et al.

(10) Patent No.: US 9,600,556 B2
(45) Date of Patent: Mar. 21, 2017

(54) METHOD FOR THREE DIMENSIONAL PERCEPTION PROCESSING AND CLASSIFICATION

(75) Inventors: Igor Cherepinsky, Sandy Hook, CT (US); Ronald G. Mccall, Stratford, CT (US); Sean S. Carlson, New Milford, CT (US); Cauvin Polycarpe, Middletown, CT (US); Joshua M. Leland, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 749 days.

(21) Appl. No.: 13/526,980

(22) Filed: Jun. 19, 2012

(65) Prior Publication Data
US 2013/0338858 A1  Dec. 19, 2013

(51) Int. Cl.
*G05D 1/00* (2006.01)
*G06F 17/30* (2006.01)

(52) U.S. Cl.
CPC .............. *G06F 17/30598* (2013.01)

(58) Field of Classification Search
CPC ................................ G06F 17/30598
See application file for complete search history.

(56) References Cited

U.S. PATENT DOCUMENTS

2005/0203930 A1*  9/2005  Bukowski et al. ........... 707/100
2011/0202510 A1*  8/2011  Salemann ..................... 707/693

FOREIGN PATENT DOCUMENTS

EP   1179788 A2   2/2002

OTHER PUBLICATIONS

Extended European Search Report for application 13172750.5, mailed Jan. 3, 2014, 6 pages.
Muldoon, R. C. et al., "Integrated mechanical diagnostic (IMD) health and usage monitoring system (hums); an open system implementation case study", Digital Avionics Systems Conference, 1999. Proceedings. IEEE col. B.6-6 col. 2 Oct. 1999.

* cited by examiner

*Primary Examiner* — Yuen Wong
(74) *Attorney, Agent, or Firm* — Cantor Colburn LLP

(57) ABSTRACT

An apparatus is described comprising at least one processor; and memory storing instructions that, when executed by the at least one processor, cause the apparatus to: organize items of raw data received from at least one sensor of a vehicle as a first data structure, organize classified data objects as a second data structure, and link at least one item of the first data structure to at least one object of the second data structure.

15 Claims, 2 Drawing Sheets

METHOD FOR THREE DIMENSIONAL PERCEPTION PROCESSING AND CLASSIFICATION

BACKGROUND

The emergence of new vehicles, such as optionally piloted vehicles (OPVs) or unmanned aerial vehicles (UAVs), require new techniques for modeling a vehicle's environment. For example, sensors are used to capture data related to the external environment of the vehicle. These sensors may vary in terms of, e.g., the type of data they collect and the amount of data they collect.

Efficiency is beneficial in terms of representation, classification, and storage of sensor data. Current schemes for organizing the data are only useful for a particular sensor or for a very specific task. For example, to be able to execute even a simple resupply mission completely autonomously, an environmental model must be able to represent and classify a wide variety of inputs and data types.

BRIEF SUMMARY

An embodiment is directed to an apparatus comprising: at least one processor; and memory storing instructions that, when executed by the at least one processor, cause the apparatus to: organize items of raw data received from at least one sensor of a vehicle as a first data structure, organize classified data objects as a second data structure, and link at least one item of the first data structure to at least one object of the second data structure.

An embodiment is directed to a system comprising: a first computing device configured to store classified data objects in a database; and a second computing device configured to receive raw data from a plurality of sensors of a vehicle and link a representation of the raw data to at least one of the classified data objects in the database.

An embodiment is directed to a method comprising: receiving, by a device, raw data from a sensor of a vehicle; organizing the received raw data as an octree that comprises a super node; storing classified data objects in a database; and linking, by the device, the super node to at least one of the classified data objects.

Other embodiments are described below.

BRIEF DESCRIPTION OF THE DRAWINGS

The present disclosure is illustrated by way of example in the accompanying figures in which like reference numerals indicate similar elements.

DETAILED DESCRIPTION

Figure 1:
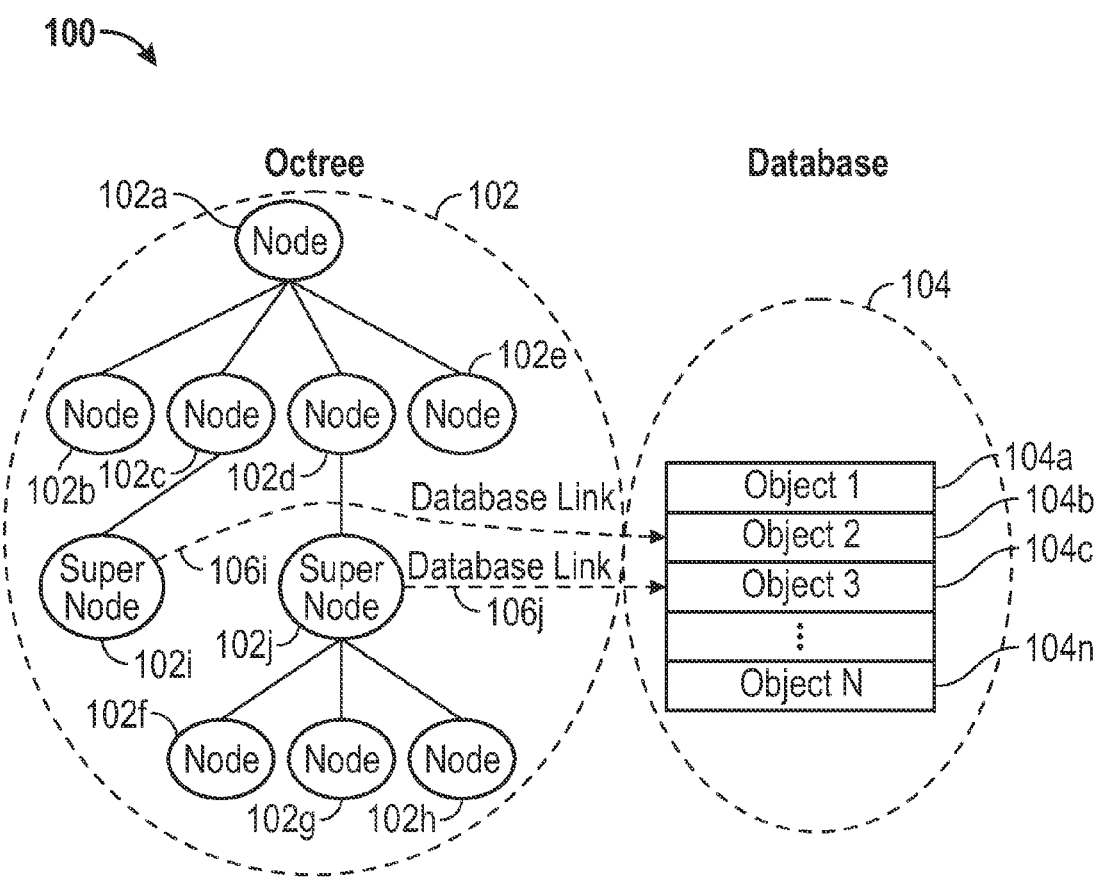
FIG. 1 illustrates an architecture in accordance with one or more aspects of this disclosure.

In accordance with various aspects of the disclosure, apparatuses, systems and methods are described for enhancing the organization and maintenance of data, such as sensor data obtained from a vehicle. In some embodiments, sensory inputs may be assimilated, classified, and/or stored. In some embodiments, raw data may be classified in real-time or near real-time (e.g., within a threshold), potentially as a background task. Modeling may be used to conduct a mission autonomously, or as a way to assist an operator (e.g., a pilot).

While largely described in connection with aircraft (e.g., airplanes, helicopters, etc.), the techniques and methodologies described herein may be adapted to accommodate other forms or types of vehicles. For example, the techniques and methodologies may be adapted to accommodate operations associated with marine vessels (e.g., boats, ships, yachts, submarines, etc.), automobiles (cars, trucks, etc.), etc.

The techniques and methodologies may be adapted to accommodate both piloted and unpiloted vehicles. For unpiloted vehicles, embodiments of the disclosure may provide for autonomous mission or task execution. For piloted vehicles, embodiments of the disclosure may provide for increased levels of automation in one or more domains (e.g., flight control, mission, emergency handling, etc.). In some embodiments, aspects of the disclosure may provide for synthetic vision for piloted vehicles. For example, objects that might otherwise be indiscernible or unrecognizable may be identified or recognized as a result of applying one or more aspects of this disclosure.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities may refer to either a direct or an indirect connection.

FIG. 1 illustrates an architecture 100 in accordance with one or more aspects of this disclosure. Architecture 100 may be implemented using a general-purpose computer executing a computer program to implement the structures and processes described herein. In exemplary embodiments, the architecture is part of a vehicle management system in a vehicle, such as an aircraft.

The architecture 100 may be used to provide a common, portable organizational structure for any number or type of vehicle. In some embodiments, the architecture 100 may provide a model indicative of an environment associated with a vehicle. As an illustrative example of operating an automobile, the model may include information needed by a driver of the automobile to navigate from a first location to a second location. For example, the model may include information such as the state of the automobile, the relative or actual positions and speeds of surrounding automobiles, the shape and contour of the road, the conditions of the road (e.g., wide or narrow lanes, smooth or rough surface conditions, etc.), weather conditions, etc.

To facilitate the structure of the architecture 100, data may be divided into one or more classes or categories. For example, as shown in FIG. 1, the architecture 100 may divide data into two classes: raw data 102 and classified objects 104. The raw data 102 and classified objects 104 may be stored in a memory associated with a vehicle management system.

The raw data 102 may be indicative of sensory data, such as data pertaining to Light Detection And Ranging (LIDAR), Laser Detection and Ranging (LADAR), radio detection and ranging (RADAR), terrain, etc. The raw data 102 may include data associated with any number of dimensions. For example, the raw data 102 may include data indicative of two, three, or four dimensions.

The raw data 102 may be organized using one or more structures, such as an octree as shown in FIG. 1. For example, the raw data 102 may be stored in one or more voxels of the octree. Each of the nodes of the octree (e.g., nodes 102*a*-102*h*) may span or define a particular space area associated with an environment to be modeled. Each child node (e.g., nodes 102*b*-102*e*) of a higher-order parent node (e.g., node 102*a*) may represent a portion of the space created by dividing the space associated with the parent node using a number of planes (e.g., using three planes).

The classified objects 104 may be organized via a database representation. Data items such as waypoints (e.g., object 1 104*a*), the particular vehicle under consideration (e.g., object 2 104*b*), a building (e.g., object 3 104*c*), and other objects (e.g., object N 104*n*, where 'N' may be a number) may be stored in a database.

In some embodiments, a conventional octree may be modified to include one or more "super nodes" at one or more levels, such as super nodes 102*i* and 102*j* in the architecture 100. The super nodes 102*i* and 102*j* may provide a link (e.g., a relational database link) to the database structure of classified objects 104. For example, as shown in FIG. 1, super node 102*i* may provide a link 106*i* to object 2 104*b* and super node 102*j* may provide a link 106*j* to object 3 104*c*.

Using the links, it may be possible to perform a search of the octree and obtain both a subset of the raw data 102 and a subset of the classified objects 104 that are relevant to the search. The relevancy of a particular item may be determined in accordance with one or more inputs, such as a specification of geographical coordinates.

The links may provide for real-time or near real-time classification of raw data 102. Once the raw data 102 is recognized, the corresponding object may be stored as a classified object 104 in the database.

To facilitate real-time utilization of an octree-database construct, the octree nodes may be allocated from a fixed pool of nodes, thereby limiting memory utilization and insuring contiguous data-structure representation in a physical memory region. Database links may be established using a pointer construct that points (e.g., directly points) to a record in a database. The aforementioned record may be allocated from a fixed pool of records as well, potentially limiting the database size. Once the link through a pointer is established it may be fixed until the database record is deleted or the octree node is deleted, in which case each entity may be returned to the corresponding pool.

The architecture 100 is illustrative. In some embodiments, additional components or entities not shown in FIG. 1 may be included. In some embodiments, one or more of the components or entities may be optional. In some embodiments, the components or entities of the architecture 100 may be arranged or configured differently from what is shown in FIG. 1.

Figure 2:
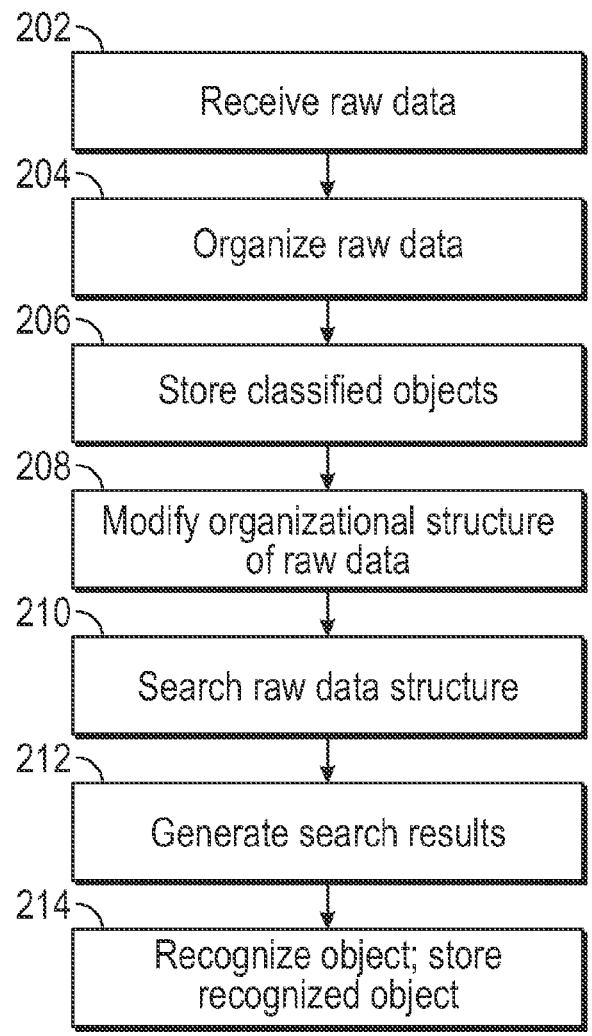
FIG. 2 illustrates a method in accordance with one or more aspects of this disclosure.

FIG. 2 illustrates a method that may be used in connection with one or more components, devices, or architectures, such as the architecture 100. The method of FIG. 2 may be used to establish or formulate one or more links between a first representation of data (e.g., a raw data or octree representation) and a second representation of the data (e.g., a classified object or database representation).

In step 202, raw data may be received. For example, the raw data may be received from one or more sensors, such as sensors associated with a vehicle (e.g., an optionally piloted vehicle (OPV) or an unmanned aerial vehicle (UAV)). The raw data may be indicative of an environment (e.g., an external environment) associated with the vehicle.

In step 204, the raw data may be organized. For example, an octree representation or structure may be used to organize the raw data. In some embodiments, wavelet and/or feature extraction and compression techniques may be applied in the organization of the raw data.

In step 206, objects that have already been classified may be stored. For example, classified objects may be stored in a database.

In step 208, an organizational structure of the raw data (e.g., an octree) may be modified or adapted to include one or more super nodes. As described herein, the super node(s) may provide a link from the raw data to the database of classified objects. In some embodiments, the super node(s) may include a time recognition character or sequence.

In step 210, a search of the raw data structure (e.g., the octree) may be performed. The search may be in response to a user request or may be performed automatically, such as in response to a sufficient number or type of raw data points or samples being available.

In step 212, search results based on the search of step 210 may be provided. The search results may include raw data (e.g., raw three dimensional data) and classified objects relevant to the search. The search results may be generated based on the link(s) associated with step 208.

In step 214, an object may be recognized based on raw data, such as the raw data associated with the search results of step 212. The recognized object may be stored in the database.

The method of FIG. 2 is illustrative. In some embodiments, one or more of the steps (or portions thereof) may be optional. In some embodiments, additional steps not shown may be included. In some embodiments, the method may execute in an order or sequence different from what is illustrated in FIG. 2.

Figure 3:
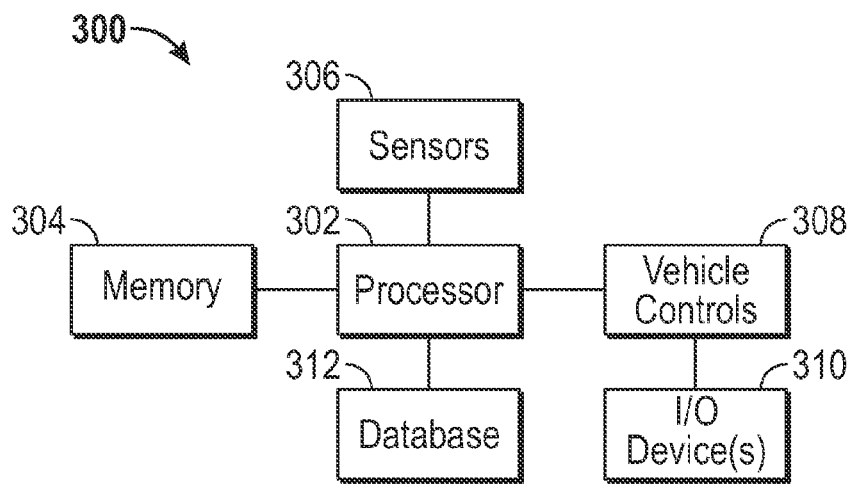
FIG. 3 illustrates a system in accordance with one or more aspects of this disclosure.

FIG. 3 illustrates a system 300 in accordance with one or more embodiments. The system 300 may be associated with a vehicle management system of a vehicle.

The system 300 may include a processor 302. The processor 302 may execute one or more instructions that may cause the system 300 to take one or more actions. The instructions may be stored in a memory 304.

The processor 302 may be operative on data received from one or more entities, such as one or more sensors 306. One or more of the sensors 306 may be associated with a vehicle.

The system 300 may provide one or more controls, such as vehicle controls 308. The vehicle controls 308 may provide directives based on, e.g., data associated with the sensors 306. Directives provided by the vehicle controls 308 may include an organization, classification, and/or linking of data as described herein. The directives may be presented on one or more input/output (I/O) devices 310. The I/O devices 310 may include a display device or screen, audio speakers, a graphical user interface (GUI), etc. In some embodiments, the I/O devices 310 may be used to enter or adjust a linking between data or sets of data.

The system 300 may include a database 312. The database 312 may be used to store data, such as the raw data 102 and/or the classified objects 104 of FIG. 1. Data stored in the database 312 may be based on data received from the sensor(s) 306. In some embodiments, the data stored in the database 312 may be based on one or more algorithms or processes. For example, in some embodiments data stored in the database 312 may be a result of the processor 302 having subjected data received from the sensors 306 to one or more filtration processes. The database 312 may be used for any number of reasons. For example, the database 312 may be used to temporarily or permanently store data, to provide a record or log of the data stored therein for subsequent examination or analysis, etc. In some embodiments, the database 312 may store a relationship between data, such as one or more links between data or sets of data.

The system 300 is illustrative. In some embodiments, additional components or entities not shown in FIG. 3 may be included. In some embodiments, one or more of the components or entities may be optional. In some embodiments, the components or entities of the system 300 may be arranged or configured differently from what is shown in FIG. 3. For example, in some embodiments the I/O device(s) 310 may be commanded by the processor 302, as opposed to being commanded by the vehicle controls 308 as shown in FIG. 3.

In some embodiments, the various entities of the system 300 may be located in, or associated with, one or more devices. For example, the processor 302, the memory 304, and the database 312 may be associated with a computing device (e.g., a server, a personal computer, a laptop, a mobile device (e.g., a smartphone), etc.) and the sensors 306, the vehicle controls 308 and the I/O device(s) 310 may be associated with a vehicle management system of a vehicle. Other arrangements or organizations of the various entities of the system 300 are within the scope of this disclosure.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments of the disclosure may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments of the disclosure may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein. In some embodiments, the functionality described herein may be implemented in hardware, software, firmware, or any combination thereof.

Aspects of the disclosure may be tied to one or more particular machines. For example, a first set of data (e.g., raw data) may be tied to a first machine or structure (e.g., an octree) and a second set of data (e.g., classified data) may be tied to a second machine or structure (e.g., a database).

Aspects of the disclosure may transform an article into a different state or thing. For example, raw sensor data may be related to data associated with one or more classified objects, potentially via one or more links. The one or more links may originate from one or more (super) nodes of a structure associated with the raw data.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. An apparatus for providing automatic control of a vehicle, the apparatus comprising:
   at least one processor; and
   memory storing instructions that, when executed by the at least one processor, cause the apparatus to:
   organize items of raw data received from at least one sensor of the vehicle as a first data structure,
   organize classified data objects as a second data structure,
   link at least one item of the first data structure to at least one object of the second data structure, and
   receive a search request and return generated search results comprising both raw data from the first data structure and classified data objects from the second data structure that are relevant to the search request,
   wherein the first data structure comprises a super node configured to provide a link as a relational database link to at least one of the classified data objects in the second data structure,
   wherein the linking of the super node to the at least one of the classified data objects provides for the automatic control of the vehicle.

2. The apparatus of claim 1, wherein the first data structure comprises an octree, and wherein the second data structure comprises a database.

3. The apparatus of claim 1, wherein the super node comprises a time recognition character or sequence.

4. The apparatus of claim 1, wherein the relevancy of the search request is based on specified geographical coordinates.

5. The apparatus of claim 1, wherein the instructions, when executed by the at least one processor, cause the apparatus to:
   perform a real-time or near real-time classification of the raw data.

6. The apparatus of claim 5, wherein the instructions, when executed by the at least one processor, cause the apparatus to:
   store an object in the second data structure responsive to classifying the raw data.

7. A system for providing automatic control of a vehicle, the system comprising:
   a first computing device configured to store classified data objects in a database; and
   a second computing device configured to
   receive raw data from a plurality of sensors of the vehicle,
   organize the raw data as an octree comprising a super node,
   use the super node to link a representation of the raw data to at least one of the classified data objects in the database, and
   receive a search request and return generated search results comprising both raw data from the octree and classified data objects from the database that are relevant to the search request,
   wherein the linking of the super node to the at least one of the classified data objects provides for the automatic control of the vehicle.

8. The system of claim 7, wherein the vehicle comprises at least one of an optionally piloted vehicle (OPV) and an unmanned aerial vehicle (UAV).

9. The system of claim 7, wherein the vehicle comprises at least one of an aircraft, a marine vessel, and an automobile.

10. The system of claim 7, wherein the second computing device is configured to classify the raw data as an object.

11. The system of claim 10, wherein the second computing device is configured to classify the raw data as an object in real-time.

12. A method for providing automatic control of a vehicle, the method comprising:
   receiving, by at least one processor, raw data from a sensor of the vehicle;
   organizing the received raw data as an octree that comprises a super node;
   storing classified data objects in a database;
   linking, by the at least one processor, the super node to at least one of the classified data objects;
   receiving a request to search the raw data; and
   returning generated search results that comprise at least a portion of the raw data and the at least one classified data object based on the linking,
   wherein the linking of the super node to the at least one of the classified data objects provides for the automatic control of the vehicle.

13. The method of claim 12, further comprising:
   classifying at least a portion of the raw data as an object; and
   storing the classified at least a portion of the raw data in the database using a link.

14. The method of claim 13, wherein the classification of the at least a portion of the raw data occurs in real-time.

15. The method of claim 12, wherein the vehicle comprises at least one of an optionally piloted vehicle (OPV) and an unmanned aerial vehicle (UAV), and wherein the linking of the super node to the at least one of the classified data objects provides for at least one of automatic flight control and emergency handling of the at least one of the OPV and UAV.

* * * * *